(12) United States Patent
Zhong et al.

(10) Patent No.: US 10,044,500 B2
(45) Date of Patent: Aug. 7, 2018

(54) ERROR CORRECTION CODING REDUNDANCY BASED DATA HASHING

(71) Applicant: ScaleFlux, San Jose, CA (US)

(72) Inventors: Hao Zhong, Los Gatos, CA (US); Fei Sun, Irvine, CA (US); Yang Liu, Milpitas, CA (US)

(73) Assignee: SCALEFLUX, INC., San Jose, CA (US)

( * ) Notice: Subject to any disclaimer, the term of this patent is extended or adjusted under 35 U.S.C. 154(b) by 54 days.

(21) Appl. No.: 15/154,035

(22) Filed: May 13, 2016

(65) Prior Publication Data

US 2016/0335154 A1    Nov. 17, 2016

Related U.S. Application Data

(60) Provisional application No. 62/161,935, filed on May 15, 2015.

(51) Int. Cl.
| | |
|---|---|
| *H04L 1/14* | (2006.01) |
| *H04L 9/06* | (2006.01) |
| *G06F 11/10* | (2006.01) |
| *H04L 9/32* | (2006.01) |

(52) U.S. Cl.
CPC ........ *H04L 9/0643* (2013.01); *G06F 11/1008* (2013.01); *H04L 9/3239* (2013.01); *H04L 2209/34* (2013.01)

(58) Field of Classification Search
None
See application file for complete search history.

(56) References Cited

U.S. PATENT DOCUMENTS

| | | | | |
|---|---|---|---|---|
| 8,848,905 B1* | 9/2014 | Hamlet | .................... | H04K 1/04 380/35 |
| 2010/0031000 A1* | 2/2010 | Flynn | ................ | G06F 17/30949 711/216 |
| 2012/0266048 A1* | 10/2012 | Chung | .................... | G06F 11/08 714/768 |
| 2012/0324310 A1* | 12/2012 | Oshida | .................. | H04L 9/3278 714/755 |
| 2013/0254441 A1* | 9/2013 | Kipnis | .................... | H03M 7/30 710/68 |
| 2014/0229790 A1* | 8/2014 | Goss | .................... | G06F 11/1048 714/755 |

(Continued)

*Primary Examiner* — Mujtaba M Chaudry
(74) *Attorney, Agent, or Firm* — Hoffman Warnick LLC

(57) ABSTRACT

Storage infrastructures and methods that generate hash values based on error correction codes. A system is provided that includes: a code retrieval system implemented on a host having logic for issuing a redundancy read command to a storage system to retrieve a redundancy code for an identified data block; and a hashing system implemented on the host for hashing the redundancy code to generate a hash value based on the redundancy code. A storage system is also provided that includes: a memory for storing data blocks and associated redundancy codes; and a controller having: an input/output for receiving a hash value read command for a specified data block from a host and returning a hash value; a decoding system that extracts a redundancy code associated with the specified data block; and an in-memory hashing system for computing a hash operation on the redundancy code.

12 Claims, 5 Drawing Sheets

(56) References Cited

U.S. PATENT DOCUMENTS

2015/0254129 A1* 9/2015 Authement ......... G06F 11/1048
714/704
2016/0110252 A1* 4/2016 Hyun .................... G11C 29/52
714/766

* cited by examiner

ERROR CORRECTION CODING REDUNDANCY BASED DATA HASHING

CROSS REFERENCE TO RELATED APPLICATION

This application claims priority to U.S. Provisional Patent Application Ser. No. 62/161,935, filed May 15, 2015, which is hereby incorporated herein as though fully set forth.

TECHNICAL FIELD

The present invention relates to the field of data storage and processing, and particularly to providing low-cost data hashing and integrity checking services in computing systems.

BACKGROUND

Data hashing is widely used in computing and storage systems for a variety of purposes, e.g., fast data addressing/locating, Bloom filter, data protection, and cryptography. A hash function can map data of arbitrary size to a fixed-size data block that typically has a much smaller size than the original data. There are a large number of hash functions, notably including various cyclic redundancy check (CRC) functions, checksums functions, and cryptographic hash functions. In current practice, a hash function carries out the hashing computation directly on the original data to obtain its hash value, and the hashing computation is typically realized by a host processor unit such as central processing unit (CPU).

SUMMARY

For computing systems that demand data hashing for data being stored in their storage and/or memory devices, this presents a system and method that can largely reduce the computational cost of data hashing. In addition, this presents an in-memory data hashing implementation solution that can further reduce the host computational workload and reduce the data traffic across the storage-memory-CPU hierarchy.

A first aspect discloses a storage infrastructure that generates hash values based on a coding redundancy, comprising: a code retrieval system implemented on a host having logic for issuing a redundancy read command to a storage system to retrieve a coding redundancy for an identified data block; and a hashing system implemented on the host for hashing the redundancy code to generate a hash value based on the coding redundancy.

A second aspect discloses a storage system, comprising: a memory for storing data blocks and associated coding redundancy; and a controller having: an input/output for receiving a hash value read command for a specified data block from a host and returning a hash value; a decoding system that extracts a coding redundancy associated with the specified data block; and an in-memory hashing system for computing the hash value from a hash operation on the coding redundancy.

A third aspect discloses a method for generating a hash value in a storage infrastructure based on a coding redundancy, comprising: issuing a redundancy read command from a host to a storage system to retrieve a coding redundancy for an identified data block; inputting the coding redundancy to the host for the identified data block; and hashing the coding redundancy on the host to generate a hash value based on the coding redundancy.

A fourth aspect discloses a method for generating hash values in a storage system, comprising: providing a memory for storing data blocks and associated coding redundancy; receiving a hash value read command for a specified data block from a host; extracting a coding redundancy associated with the specified data block; computing a hash value from the coding redundancy; and returning a hash value.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to embodiments of the invention, examples of which are illustrated in the accompanying drawings.

This described approach reduces the computational complexity of data hashing in computing systems. In current practice, given the original data chunk (i.e., data block) to be hashed, the hash function always directly applies the hashing computation onto the original data to obtain the corresponding hash value. In computing systems, the data being stored in data storage devices (such as hard disk drives and solid-state drives) and memory (such as DRAM) are typically protected by error correction coding (ECC) to ensure the data storage integrity and reliability. In essence, ECC encoding carries out a certain computation, which is typically much more complicated than data hashing, on the original data to generate some redundant data called coding redundancy. The coding redundancy is highly correlated with the original data, and the ECC decoding leverages such a strong data correlation to detect and correct errors.

Figure 1:
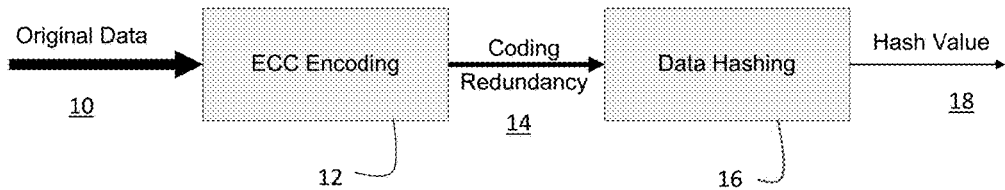
FIG. 1 illustrates the data flow of using coding redundancy based data hashing according to embodiments.

As illustrated in FIG. 1, original data 10 is first encoded with ECC encoding 12 to generate coding redundancy 14. The coding redundancy 14 is then hashed with data hashing 16 to generate a hash value 18. The described approach thus applies the data hashing computation 16 onto the coding redundancy 14 (e.g., an 8 byte value) of the original data, instead of the original data 10 (e.g., a 4K byte value), to obtain a hash value 18 for the original data 10. Since the size of coding redundancy 14 is much less than the size of the original data 10 in typical data storage and memory devices (e.g., 8× less), the data hashing 16 computational complexity can be proportionally reduced. The hash function can remain the same as in current practice.

In current practice, data storage systems carry out the ECC encoding/decoding internally, which is completely transparent to the host. For the data being stored in memory such as DRAM, the memory controller inside the host processor carries out the ECC encoding/decoding, and the operation is typically transparent to the other components in the host processor. Hence the coding redundancy is not accessible by the other components such as the CPU core.

As a result, in current practice, the host processor (i.e., "host") is not able to directly utilize hashing of redundancy codes to reduce the data hashing computational complexity. To address this issue, two solutions are presented. The first solution is to enhance the host-storage system interfaces in order to allow the host to directly retrieve the ECC coding redundancy from the storage system, i.e., data storage devices or on-chip memory controller. The second solution is to off-load the data hashing computation to the storage system.

To allow the host to directly retrieve the ECC coding redundancy, the first approach enhances the host-storage interface by adding one or more new commands. Typically, each data block being stored in data storage devices and memory is associated with a unique identification (e.g., the address). In current practice, given the identification of the data being requested by the host, the storage devices and memory controller always send the original data back to the host. This approach adds a new command, referred to as "ECC redundancy read command," that specifically requests the storage devices and memory controller to send the ECC coding redundancy, instead of the original data, back to the host.

Figure 2:
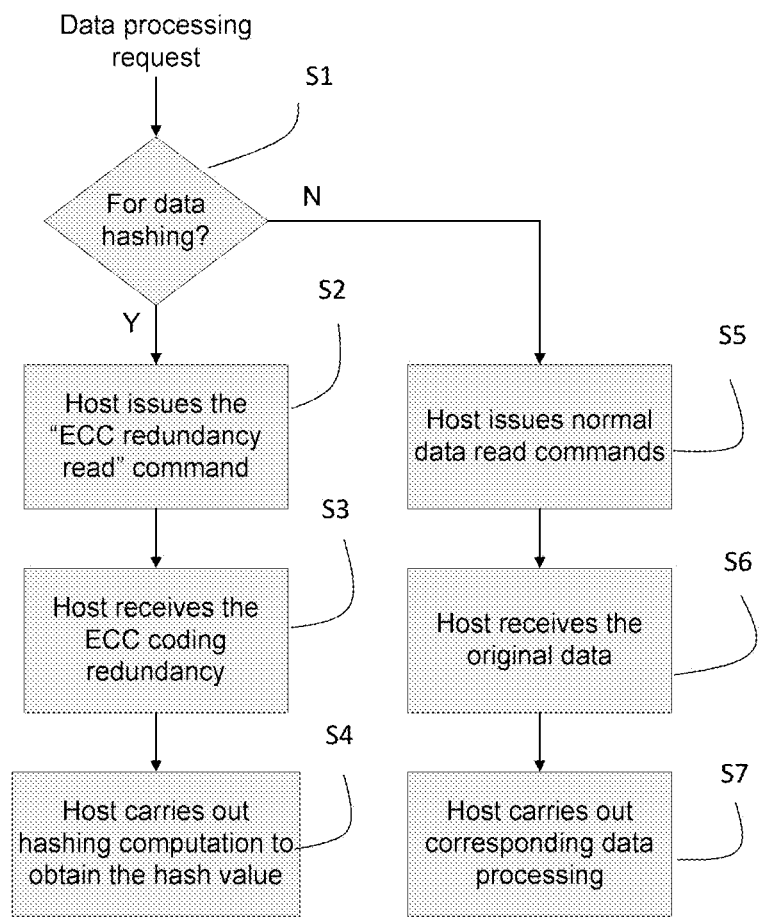
FIG. 2 illustrates the operational flow when the host carries out the data hashing according to embodiments.

FIG. 2 illustrates the host command issue data flow. When a data process request is issued within the host, a determination is made at S1 whether the request is for a data hashing operation. If the request is for data hashing, then the host issues an ECC redundancy read command at S2 to the storage system. The ECC redundancy read command may for example include an address of an associated data block and an indicator (e.g., an n-bit value) to return a coding redundancy and not the actual data. Then at S3, the host receives the ECC coding redundancy from the storage system at S3 and carries out a hashing computation on the ECC coding redundancy to obtain the hash value. If the request is not for hashing, the host issues a normal data read command at S5, receives the original data at S6, and carries out the corresponding data processing at S7. Thus, when the host needs to carry out data hashing, it issues the "ECC redundancy read command" instead of normal data read command, and carries out the hashing computation based upon the ECC coding redundancy of the data.

The second approach is to offload the data hashing computation from the host to the storage system, which is referred to as in-memory data hashing. In this context, the host simply issues a command, referred to as "hash value read" command, to the data storage device or memory controller, and a hash value based on the ECC coding redundancy is returned.

Figure 3:
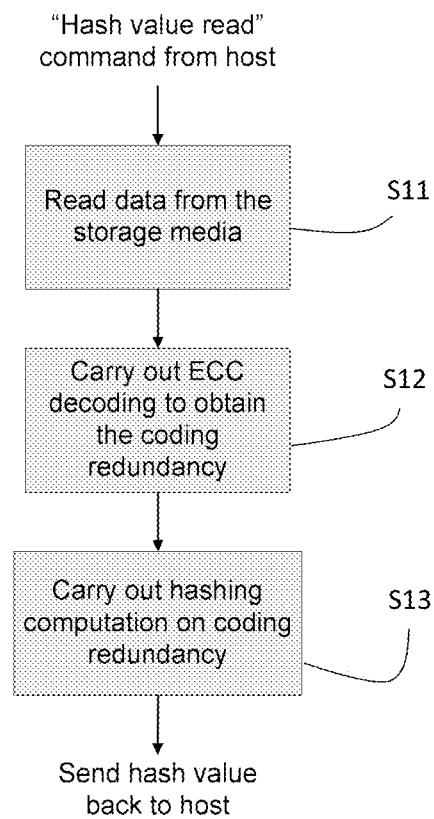
FIG. 3 illustrates the operational flow when the data hashing is offloaded to the data storage devices and/or memory controller according to embodiments.

FIG. 3 shows the operational data flow inside data storage devices and memory controller for supporting in-memory data hashing. Upon receiving a "hash value read" command with the corresponding address of the data to be hashed from the host, the data storage device or memory controller reads the data from the storage media (e.g., flash memory chips, DRAM chips, etc.) at S11, carries out the ECC decoding to recover the coding redundancy at S12, and then carries out the hashing on the coding redundancy to obtain the hash value at S13. Once obtained, the hash value is sent back to the host.

Figure 4:
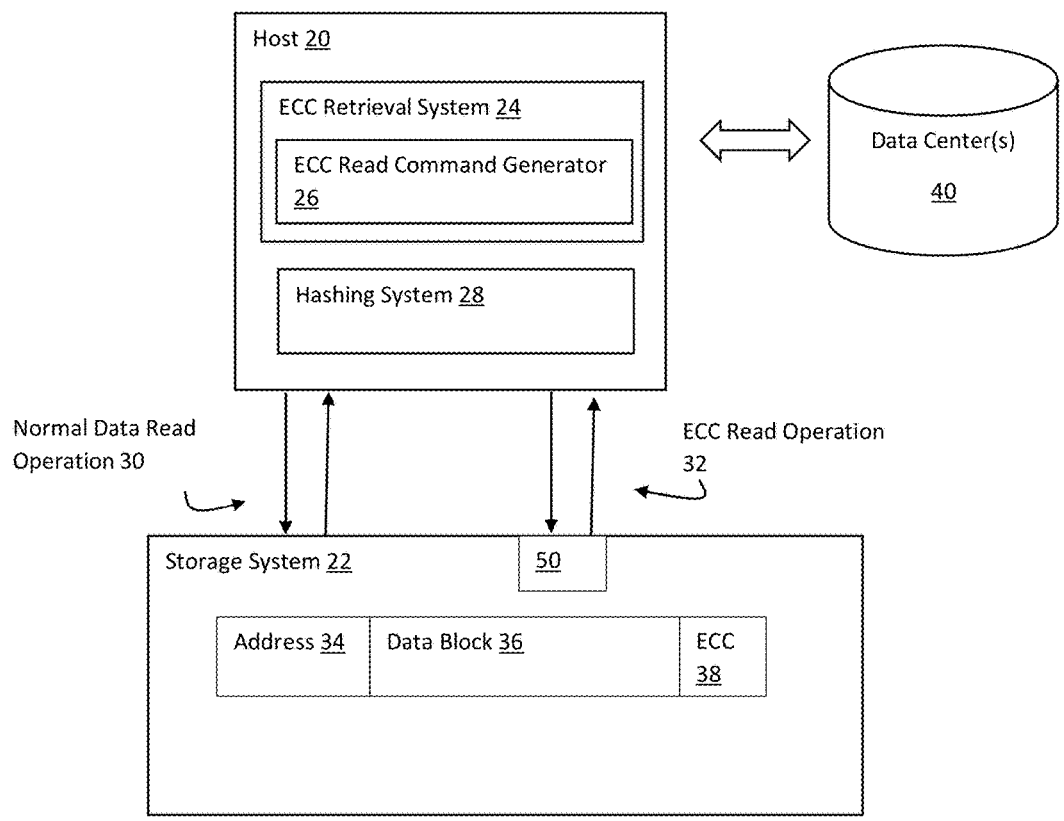
FIG. 4 illustrates a storage infrastructure for implementing the process shown in FIG. 2.

FIG. 4 depicts an infrastructure for carrying out the first process shown in FIG. 2. In this case, the host 20 includes an ECC retrieval system 24 that has an ECC read command generator 26 and a hashing system 28. As noted, when a normal data read operation 30 is processed by the host 20, the host 20 sends an address 34 to the storage system 22 for a data block 36, and the data block 36 is returned. When an ECC read operation 32 is processed by host 20, host 20 send an ECC redundancy read command to the storage system 22 and the coding redundancy (ECC 38) is returned.

The hashing system 28 can then process the ECC 38 and generate a hash value (or signature) that it can use, e.g., to determine if the associated data block 36 exists in some other data center 40, by performing a similar operations with data center 40 and comparing hash values. ECC retrieval system 24 may be implemented in software (e.g., with a software driver) to simplify the solution on the host 20. The storage system 22 may utilize an ECC read command processor 50 that parses and processes the ECC read command to extract ECC 38, e.g., by decoding an identified block of data to determine the ECC 38 using existing ECC coding/decoding infrastructure.

Figure 5:
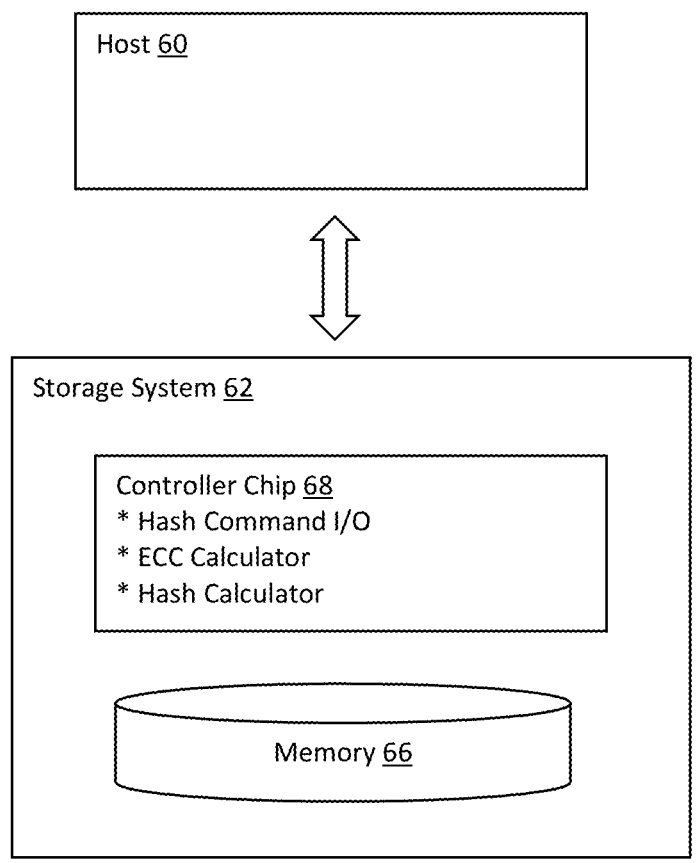
FIG. 5 illustrates a storage infrastructure for implementing the process shown in FIG. 3.

FIG. 5 depicts an infrastructure for carrying out the second process shown in FIG. 3. In this case, the host 60 sends a "hash value read" command to storage system 62, which includes a controller chip 68 (such as an integrated circuit chip, ASIC device, or other system) that includes an, I/O for receiving commands and outputting hash values, an ECC calculator for decoding data to generate redundancy coding and a hash calculator for performing a hash operation. Accordingly, in this embodiment, the controller chip 68 will read the data from memory, decode the ECC value, calculate the hash value based on the ECC value, and return the hash value to host 60.

The embodiments of the present disclosure are applicable to various types of storage devices without departing from the spirit and scope of the present disclosure. It is also contemplated that the term host may refer to various devices capable of sending read/write commands to the storage devices. It is understood that such devices may be referred to as processors, hosts, initiators, requesters or the like, without departing from the spirit and scope of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by processing logic implemented in hardware and/or computer readable program instructions. For example, the processing logic in the storage system may be implemented with a field programmable gate array (FPGA) device, application specific integrated circuit (ASIC) device, a general purpose IC, or any other device.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A storage infrastructure that generates hash values based on a coding redundancy, comprising:
    a storage system configured to selectively output (a) a specified data block with a corresponding coding redundancy and (b) a coding redundancy without a corresponding data block;
    a host having logic for issuing a normal read command to retrieve the specified data block with the corresponding coding redundancy and for issuing a redundancy read command to retrieve the coding redundancy without the corresponding data block; and
    a hashing system implemented on the host for hashing the coding redundancy obtained in response to the redundancy read command to generate a hash value based on the coding redundancy.

2. The storage infrastructure of claim 1, wherein the coding redundancy comprises an error correction code (ECC).

3. The storage infrastructure of claim 1, further comprising the storage system, wherein the storage system includes a read command processor that parses and processes the redundancy read command to extract the coding redundancy for the corresponding data block.

4. The storage infrastructure of claim 1, wherein the hash value is utilized by the host to perform at least one of: fast data addressing/locating, Bloom filtering, data protection, and cryptography.

5. A storage system, comprising:
    a memory for storing data blocks and an associated coding redundancy for each data block; and
    a controller having:
        an input/output for receiving a hash value read command for a specified data block from a host and returning a hash value of a corresponding coding redundancy to the host without the specified data block;
        a decoding system that extracts the coding redundancy associated with the specified data block; and
        an in-memory hashing system for computing the hash value from a hash operation on the coding redundancy.

6. The storage system of claim 5, wherein the coding redundancy comprises an error correction code (ECC).

7. The storage system of claim 5, wherein the controller comprises an integrated circuit chip.

8. A method for generating a hash value in a storage infrastructure based on a redundancy code, comprising:
    issuing a redundancy read command from a host to a storage system to retrieve a coding redundancy corresponding to an identified data block, wherein the coding redundancy is retrieved back to the host without the identified data block;
    inputting the coding redundancy to the host for the identified data block;
    hashing the coding redundancy on the host to generate a hash value based on the redundancy code; and
    using the hash value to determine if the identified data block exists elsewhere in the storage infrastructure.

9. The method of claim 8, wherein the coding redundancy comprises an error correction code (ECC).

10. The method of claim 8, further comprising:
    receiving the redundancy read command on a storage system; and
    parsing and processing the redundancy read command to extract the coding redundancy for the identified data block.

11. The method of claim 8, wherein the hash value is utilized by the host to perform at least one of: fast data addressing/locating, Bloom filtering, data protection, and cryptography.

12. The method of claim 8, wherein the hash value is utilized by the host to determine if the identified data block exists in another data storage system.

* * * * *